Figure 1:
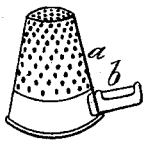
Figure 2:
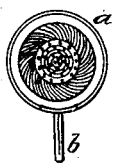
Figure 3:

J. C. R. Steirly.
Thimble.

Nº 25450.   Patented Sept. 13. 1859.

Witnesses.
Richard Rist Steirly
Jas Ferguson

Inventor
J. C. Rist Steirly

UNITED STATES PATENT OFFICE.

J. C. R. STEIRLY, OF BROOKLYN, NEW YORK.

THIMBLE.

Specification of Letters Patent No. 25,450, dated September 13, 1859.

*To all whom it may concern:*

Be it known that I, JAMES CHRISTIAN RIST STEIRLY, of the city of Brooklyn, county of Kings, and State of New York, have invented a new and Improved Mode of Cutting Threads or other Fabrics Used in the Various Departments of Light Manufactures; and I do hereby declare that the following is an exact description thereof, reference being had to the accompanying drawings and letters of reference marked thereon.

The improvement consists in a small attachment of brass, steel or other hard metal on the side of the thimble near the opening and containing an edge of fine tempered steel from one eighth to one half inch in length and about $\frac{3}{16}$ of an inch in width the whole fixed on the thimble by brazing as shown in the drawings in which—

$a$ is the thimble and $b$ the cutter. The thimble is to be placed on the finger of the operator in the most convenient position. By the employment of a thimble thus constructed the operator is enabled to dispense with the use of knives and scissors for the purpose of cutting thread, the cutter performing that duty. The mode of using or applying the thread cutting attachment is by pressing the edge forward while the thread is held so as to offer a degree of resistance.

What I claim as my invention and desire to secure by Letters Patent is—

The combination of the thimble and cutter in the manner and for the purposes set forth.

JAMES CHRISTIAN RIST STEIRLY.

Witnesses:
SANFORD S. BROAD,
WILLARD MESSER.